United States Patent [19]

Trudell

[11] Patent Number: 4,623,160

[45] Date of Patent: Nov. 18, 1986

[54] EXTENSIBLE STEP ASSEMBLY FOR VEHICLES

[76] Inventor: Jerry W. Trudell, 1027 Alpine Rd., P.O. Box 302, Montrose, Colo. 81401

[21] Appl. No.: 773,043

[22] Filed: Sep. 6, 1985

[51] Int. Cl.⁴ ............................................... B60R 3/02
[52] U.S. Cl. ...................................... 280/166; 182/96; 182/127
[58] Field of Search .......................... 182/95, 96, 127; 248/277, 421; 280/166, 163

[56] References Cited

U.S. PATENT DOCUMENTS

| | | | |
|---|---|---|---|
| 2,575,615 | 11/1951 | Crump | 182/95 |
| 2,682,671 | 7/1954 | Faure | 5/507 |
| 3,807,757 | 4/1974 | Carpenter et al. | 182/95 X |
| 4,020,920 | 5/1977 | Abbott | 182/96 |
| 4,073,502 | 2/1978 | Frank et al. | 280/166 |
| 4,108,457 | 8/1978 | Garrett | 182/95 X |
| 4,116,457 | 9/1978 | Nerem et al. | 280/166 |
| 4,185,849 | 1/1980 | Jaeger | 280/166 |

Primary Examiner—John J. Love
Assistant Examiner—Michael Mar
Attorney, Agent, or Firm—Fields, Lewis, Pittenger & Rost

[57] ABSTRACT

A step assembly for vehicles has a support frame mounted under the floor of a vehicle, a pair of side linkage assemblies connect upper and lower steps to the frame to support them for movement between retracted and extended positions. An over-center lock holds the side linkage assemblies in the extended position. A reciprocating actuator coupled to a rotary drive shaft which upon rotation releases the lock and moves the linkage between the two positions.

14 Claims, 11 Drawing Figures

U.S. Patent  Nov. 18, 1986  Sheet 1 of 3  4,623,160
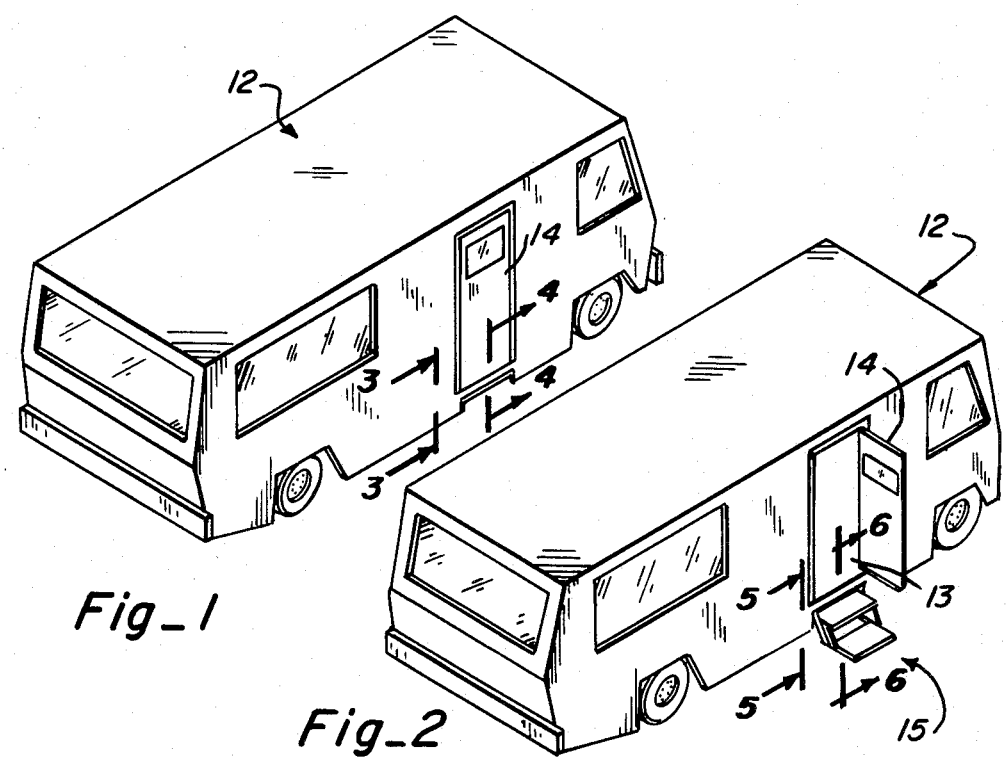
Fig_1
Fig_2
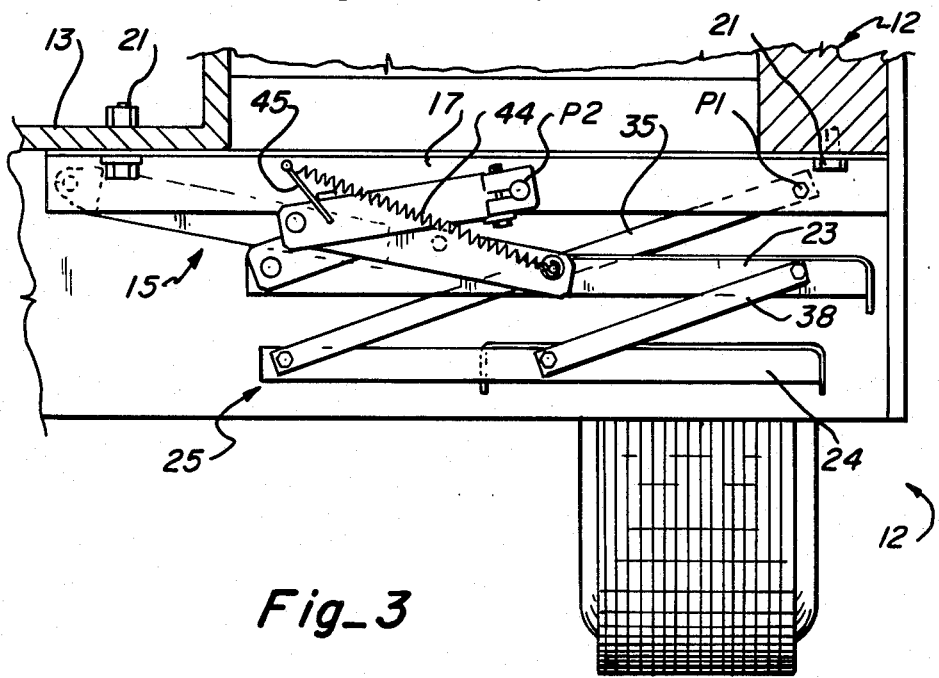
Fig_3

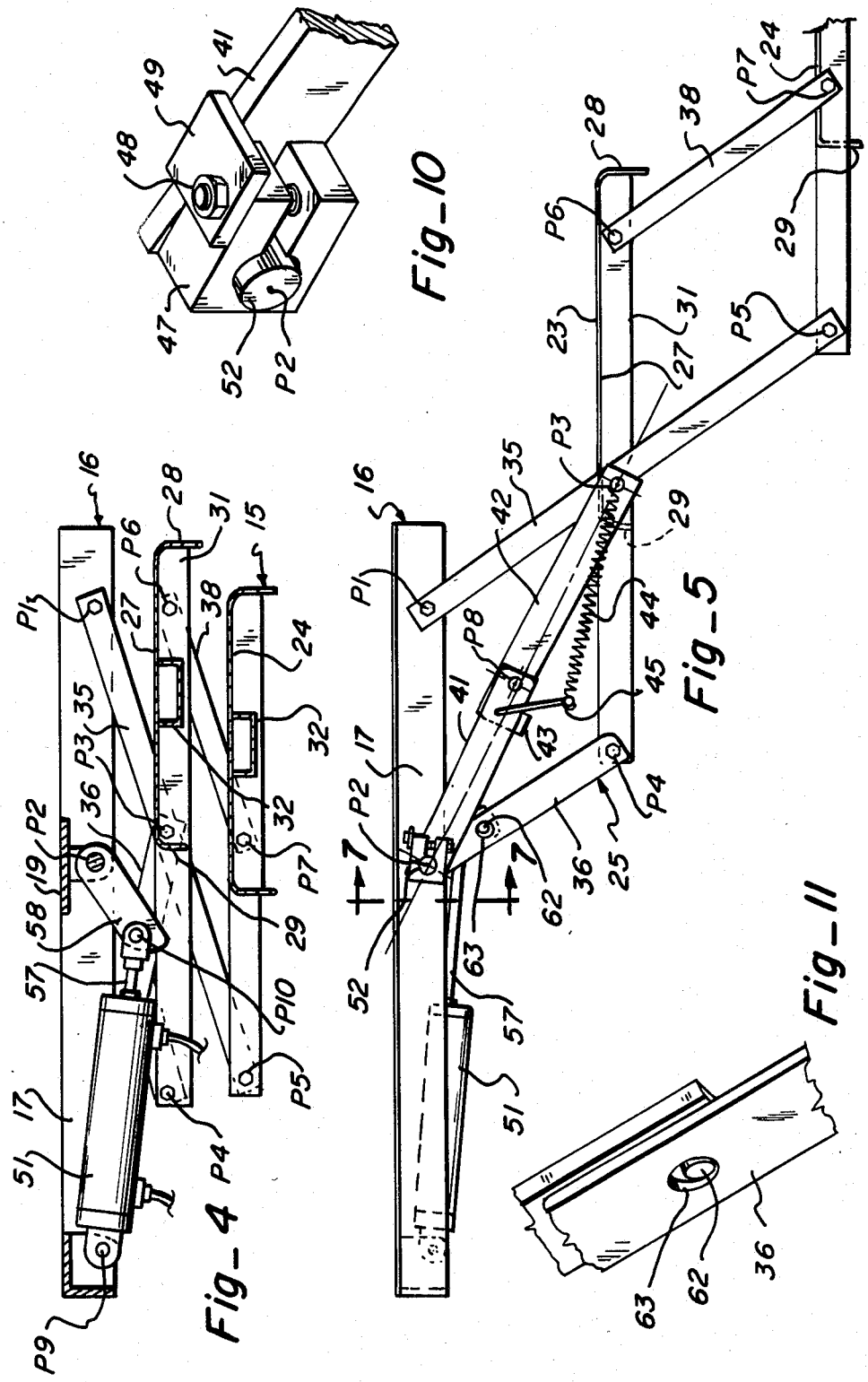

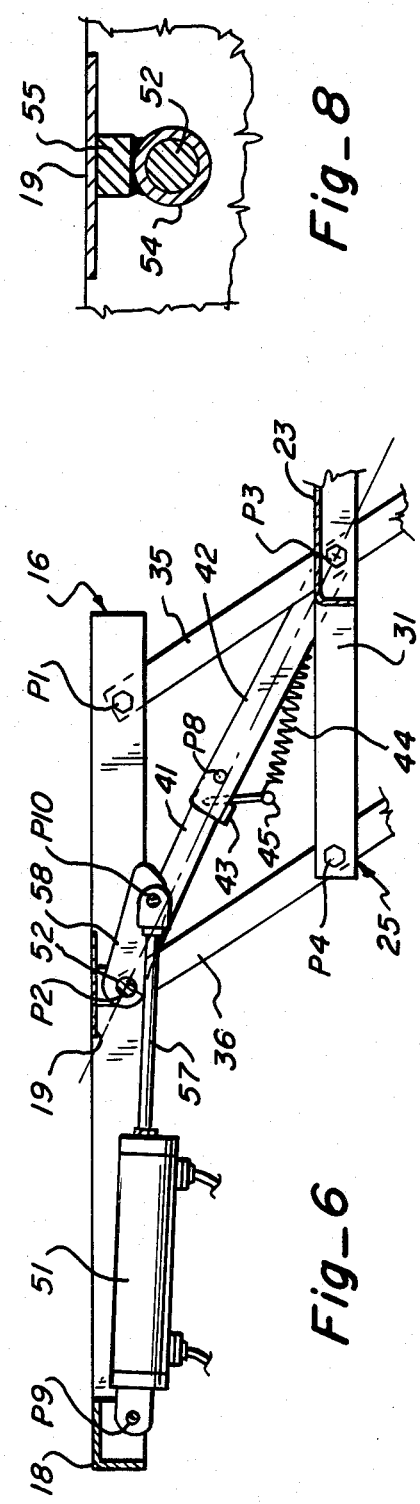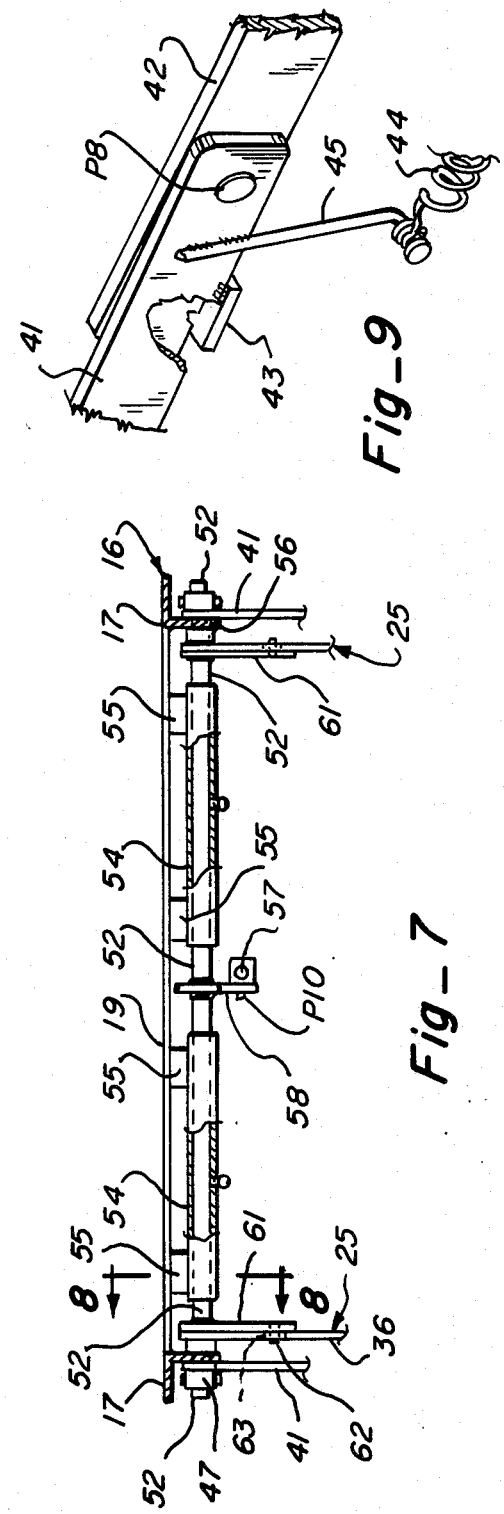

4,623,160

EXTENSIBLE STEP ASSEMBLY FOR VEHICLES

TECHNICAL FIELD

This invention relates generally to retractable steps and more particularly to a novel and improved power-driven retractable step assembly for vehicles and the like.

BACKGROUND ART

Recreational type vehicles have the floor level a substantial distance above the ground level for clearance making a step necessary for gaining access.

A variety of different types of step assemblies have been provided for such access. There is still a need for a safe, convenient, durable and easy to operate step assembly for recreational vehicles and the like.

U.S. Pat. No. 2,575,615 to Crump discloses a retractable step assembly having two steps supported from a vehicle floor but the side linkages do not extend out at a substantial angle from the vertical and no locking arrangement or drive arrangement is disclosed.

U.S. Pat. No. 2,682,671 to Faure extends the side linkages out from the vertical at a substantial angle but does not provide an actuator and drive shaft arrangement to both move the linkages and release a locking arrangement.

U.S. Pat. No. 4,073,502 to Frank discloses the use of a biasing spring to move the step to a lowered position and a diaphram to retract the step while U.S. Pat. No. 4,020,920 to Abbott discloses the use of a hydraulic-pneumatic actuator connected to the lower step. In neither of the disclosures does the actuator both power the release of the locking mechanism and act upon at least one of the side linkages to positively drive the linkages to both positions through a common rotary drive shaft.

Additional retractable step structures are disclosed in U.S. Pat. Nos. 4,116,457, Nerem el al., and 4,185,849, Jaeger.

DISCLOSURE OF INVENTION

An extensible step assembly disclosed includes a supporting frame mounted under the floor of the vehicle and upper and lower steps supported from the frame by a pair of side linkage assemblies. Each side linkage assembly includes linkage bars pivotally connected to the upper frame and to the steps. The linkage bars extend forwardly at a substantial angle from the vertical in the extended position. An over-center lock connected to the side linkage assembly holds the steps in the extended position. An actuator disclosed as a two-way air cylinder and rotary drive shaft moves the lock to release the linkage and also moves the side linkage assemblies to move the steps between extended and retracted positions.

BRIEF DESCRIPTION OF DRAWINGS

The details of this invention will be described in connection with the accompanying drawings, in which:

FIG. 1 is a top perspective view of a vehicle on which the step assembly of the present invention is installed, shown in the retracted position;

FIG. 2 is a top perspective view of the vehicle with the steps shown in the extended position;

FIG. 3 is a sectional view taken along lines 3—3 of FIG. 1;

FIG. 4 is a sectional view taken along lines 4—4 of FIG. 1;

FIG. 5 is a sectional view taken along lines 5—5 of FIG. 2;

FIG. 6 is a sectional view showing the steps in the extended position;

FIG. 7 is a sectional view taken along lines 7—7 of FIG. 5;

FIG. 8 is a sectional view taken along lines 8—8 of FIG. 7;

FIG. 9 is a fragmentary perspective view showing a bias arrangement for the over-center locking;

FIG. 10 is a fragmentary perspective view showing the clamp to the shaft; and

FIG. 11 is a fragmentary perspective view showing the drive pin for moving the linkage assemblies.

DETAILED DESCRIPTION

Referring now to the drawings and particularly to FIG. 1 and 2, there is shown a recreational vehicle 12 having a raised floor 13 at the doorway and an access door 14. An extensible step assembly 15 according to the present invention is shown at the doorway in the retracted position in FIG. 1 and in the extended position in FIG. 2.

The step assembly 15 includes an upper frame 16 having parallel side members 17 and an end member 18 connecting opposite rear ends of the side members to form a U-shape. An intermediate member 19 spaced from and parallel to the end member connects intermediate positions of the side members together to form a rigid open frame structure. The side and end members are shown as having a right angle cross-section while member 19 is in the form of a flat metal plate. The frame 16 is shown bolted by bolts 21 to the underside of the floor of the vehicle rearwardly of the plane of the side of the vehicle.

An upper step 23 and a lower step 24 are supported from the frame by a pair of identical side linkage assemblies 25 for movement between retracted and extended positions. While only one step could be used, two are preferred in order to reduce the height of each step for the user.

Each step shown has a flat top portion 27 with down-turned front and rear rounded edge portions 28 and 29, respectively, together with spaced parallel side plates 31. A cross channel section 32 is mounted under the top portion and connects to the outer plates 31 for added strength.

Each side linkage assembly 25 includes a front linkage bar 35 pivotally connected to the frame side member at a front upper pivot P1. A rear linkage bar 36 is pivotally connected to the same frame side member at a rear upper pivot P2.

Step 23 is pivotally connected to the front linkage bar 35 at a front lower pivot P3 and to the inner linkage bar 36 at a rear lower pivot P4. A rear extension of side plate 31 extends rearwardly of the rear rounded edge poriton 29 of the step to connect to the lower end of bar 36 at pivot P4. In this way a parallelogram structure is formed with linkage bars 35 and 36 being opposite one another and frame 16 and step 23 being opposite one another and connected at pivots P1, P2, P3 and P4. Pivots P1 and P2 are stationary while pivots P3 and P4 move through an arc as the steps move between the extended and the retracted positions. In the extended position bars 35 and 36 extend downwardly and forwardly at an angle and in the retracted position they extend downwardly and rearwardly at an angle. The front pivot is inside or rearwardly of the side of the vehicle.

For supporting the lower step front linkage bar 35 extends beyond pivot P3 and pivotally connects at the rear of the step at a lower rear pivot P5. A lower front linkage bar 38 is pivotally connected at its upper end at pivot P6 to the front end portion of upper step 23 and is pivotally connected at its lower end to the rear end portion of lower step 24 at pivot P7. In this way parallelogram structure is formed with linkage bars 35 and 38 opposite one another and steps 23 and 24 opposite one another.

A lock is provided for holding the side linkage assemblies in the extended position. This lock includes a rear locking bar 41 pivotally connected at pivot P2 and a front locking bar 42 pivotally connected at pivot P3, the locking bars being connected at a common center pivot P8.

The rear locking bar 42 has a locking flange 43 along one side that limits the rotation of bar 42 to a short distance past the over-center position and in this way holds the linkage in the extended position in response to weight being applied to the steps. The locking bars 41 and 42 also serve to limit the extent of forward movement of the linkage assemblies.

A coiled spring 44 is connected at one end to a rod 45 extending down from the bar 41 rearwardly of pivot P8 and at the other end at pivot P3 to bias the locking bars in an over-center position when the linkage is in the extended position.

For the release of the locking mechanism a clevis 47 is secured to the end of a drive shaft 52, described hereinafter outwardly of rear locking bar 42 by a bolt 48. Clevis 47 carries a release plate 49. Upon rotation of the shaft clockwise as seen in FIG. 10, the release plate 49 moves against the rear locking bar to swing the front locking bar past the over-center position.

The power-actuated drive arrangement for moving the linkage assemblies and releasing the lock includes an air cylinder 51 arranged to drive a rotary drive shaft 52. The air cylinder has its rear end pivotally connected to the rear of the frame at pivot P9. Drive shaft 52 is journaled in a pair of alined sleeve bearings 54 affixed to the underside of and supported by the intermediate member 19. In particular, spacer bars 55 are welded to the underside of the member 19 and to the bearings so that the drive shaft will rotate in the bearings. The ends of the shaft extend through alined openings 56 in the side members 17.

A center drive bar 58 is affixed to the shaft intermediate its ends. The movable rod 57 of the drive cylinder is pivotally connected to the center drive bar 58 at pivot P10 so that extension of the cylinder rod moves the drive bar to a forward position and rotates the drive shaft in a counterclockwise direction, as seen in FIG. 6. Retraction of the cylinder rod 57 rotates the center drive bar and shaft in a clockwise direction.

The air cylinder 51 shown is powered by a suitable source of pressurized air such as an air compressor driven off the battery of the vehicle.

The air compressor would be on the vehicle and have suitable flow lines connected to the air compressor with the air flow controlled by electrically operated flow control valves also powered by the battery. A switch in the control circuit can be made responsive to the opening of the vehicle door so as to have the steps extend when the door is opened. An alternative to air cylinder 51 would be an electric solenoid that would reciprocate the drive shaft with a suitable control to selectively actuate the solenoid.

An outer drive bar 61 is affixed to the drive shaft outwardly of the sleeve bearings and each outer drive bar 61 has a drive pin 62 projecting from an outer end portion parallel to the axis of rotation of the drive shaft. This pin extends through an opening 63 in the inner linkage bar to swing the linkage assembly between the retracted and extended positions.

The rotation of the drive shaft moves the linkage to the retracted position. In the reverse stroke the cylinder rod is extended and the linkage bars are moved by forces applied through the drive pins while the locking bars follow the linkage and the spring 44 moves them to the over-center position. Any force applied to the steps causes the flange 43 to bear against the locking bar and holds the steps in a parallel position.

Although the present invention has been described with a certain degree of particularity, it is understood that the present disclosure has been made by way of example and that changes in details of structure may be made without departing from the spirit thereof.

What is claimed is:

1. An extensible step for a vehicle comprising:
a frame mounted to said vehicle;
at least one step connected to said frame by a pair of side linkage assemblies for movement of said step between a retracted position for storage, and an extended position for use,
each linkage assembly including a front linkage bar pivotally connected to said frame at a first pivot rearwardly of the forward end of said frame and a rear linkage bar pivotally connected to said frame at a second pivot rearwardly of said first pivot,
said step being pivotally connected to said front linkage bar at a third pivot and to said rear linkage bar at a fourth pivot to form a parallelogram structure having said linkage bars opposite one another and said frame and step opposite one another with said linkage bars extending forwardly at a substantial angle from the vertical in the extended position to locate the forward end of said step beyond the forward end of said frame a greater distance than the maximum vertical distance between the step and first pivot and to locate the forward end of said step rearwardly of the forward end of said frame with said step being folded under said frame in the retracted positon, said first pivot being located rearwardly of the side of the vehicle and said step beyond the side of the vehicle in the extended position,
locking means coupled to said linkage assemblies to lock said linkage assemblies in the extended position; and
power-actuated drive means coupled to said linkage assemblies to release said locking means and to move said step between retracted and extended positions;
said drive means including a source of motive power and a drive shaft rotated in either direction by said source of motive power, said drive shaft having first means engaging said locking means to release said locking means when said shaft is rotated in one direction and second means engaging said linkage assemblies to positively drive said linkage assemblies to the extended position when said drive shaft is rotated in one direction and to positively drive said linkage assemblies to the retracted position when said shaft is rotated in the opposite direction.

2. An extensible step as set forth in claim 1 wherein said frame includes a pair of substantially parallel side members and an end member connecting opposite rear ends of said side members together to form a U-shape, and an intermediate member spaced from and substantially parallel to said end member and connecting intermediate portions of said side members together to form a rigid open frame structure.

3. An extensible step as set forth in claim 2 wherein said side and end members have a right angle cross section with said side members extending up and laterally out at the top and said end member extending up and rearwardly at the top.

4. An extensible step as set forth in claim 1 further including a second step pivotally connected at a fifth pivot to an extension of said front linkage bar and pivotally connected at a sixth pivot to a front lower linkage bar pivotally connected to the first step at a sixth pivot and pivotally connected to the second step at a seventh pivot to form a second parallelogram structure that is an extension of said first-mentioned parallelogram structure.

5. An extensible step as set forth in claim 1 wherein said step includes a top portion, rounded front and rear end portions, a pair of spaced parallel side portions, and a reinforcing channel extending under said top portion and connected at the ends to said side portion, said side portions extending rearwardly beyond said rear end portion.

6. An extensible step as set forth in claim 1 wherein said locking means includes a first locking bar pivoted at said second pivot, a second locking bar pivoted at said third pivot, said locking bars being connected by a common pivot, and biasing means to move said locking bars to an over-center position when said side linkage assemblies are in the extended position.

7. An extensible step as set forth in claim 6 wherein said biasing means includes a coiled spring connected to a rod extending down from said first locking bar and connected at said third pivot.

8. An extensible step as set forth in claim 1 wherein said drive means includes an actuator and a drive shaft mounted for rotation between a pair of side frame members and having an intermediate portion connected to said actuator to be rotated in either direction.

9. An extensible step as set forth in claim 8 wherein said actuator is a two-way air cylinder.

10. An extensible step as set forth in claim 8 wherein said drive means further includes a drive bar connected at each end of said drive shaft that moves against said first locking bar upon the rotation of said drive shaft to release said locking means.

11. An extensible step for a vehicle comprising:
a frame mounted to said vehicle;
at least one step connected to said frame by a pair of side linkage assemblies for movement of said step between a retracted position for storage, and an extended position for use,
each linkage assembly including a front linkage bar pivotally connected to said frame at a first pivot and a rear linkage bar pivotally connected to said frame at a second pivot,
said step being pivotally connected to said front linkage bar at a third pivot and to said rear linkage bar at a fourth pivot to form a parallelogram structure having said linkage bars opposite one another and said frame and step opposite one another with said linkage bars extending forwardly at a substantial angle from the vertical to locate the first pivot rearwardly of the side of the vehicle and said step beyond the side of the vehicle in the extended position,
locking means coupled to said linkage assemblies to lock said linkage assemblies in the extended position;
power-actuated drive means coupled to said linkage assemblies to release said locking means and to move said step between retracted and extend positions;
said drive means including an actuator and a drive shaft mounted for rotation between a pair of side frame members and having an intermediate portion connected to said actuator to be rotated in either direction; and
said drive means further including a drive bar connected at each end of said drive shaft and a drive pin on said drive bar extending into an opening in an associated upper linkage bar to rotate said upper linkage bar when said drive shaft is rotated.

12. An extensible step as set forth in claim 9 wherein said opening is substantially greater than the diameter of the drive pin to provide a range of free swing for said drive pin in relation to said drive bar.

13. An extensible step assembly for a vehicle having a floor structure below a doorway comprising:
a frame mounted to said floor structure;
an upper step and a lower step connected to said frame by a pair of side linkage assemblies for movement between a retracted position for storage and an extended position for use,
each linkage assembly including a front linkage bar pivotally connected to said frame at a first pivot and a rear linkage bar pivotally connected to said frame at a second pivot a distance inwardly along the frame from said first pivot,
said upper step being pivotally connected to said front linkage bar at a third pivot and to the rear linkage bar at a fourth pivot to form a parallelogram structure, said linkage bars being opposite one another and said frame and step being opposite one another and connected at said pivots,
said lower step being pivotally connected at a fifth pivot to an extension of said front linkage bar and pivotally connected at sixth pivot to a front lower linkage bar,
said front lower bar being pivotally connected to the lower step at a seventh pivot,
said linkage bars extending downwardly and outwardly at an angle in the extended position and downwardly and inwardly at an angle in the retracted position to locate the forward end of said step beyond the forward end of said frame a greater distance than the maximum vertical distance between the step and first pivot in the extended position and to locate the forward end of said step rearwardly of the forward end of said frame with said steps being folded under said frame in the retracted position, said first pivot being located rearwardly of the side of the vehicle and said step beyond the side of the vehicle in the extended position;
an over-center locking means to limit the extent of forward movement and to lock said linkage assemblies in the extended position, said locking means including a first locking bar pivoted at said second pivot, a second locking bar pivoted at said third pivot, said locking bars being connected by a common pivot; and drive means including a reciprocating actuator and a drive shaft adapted to be rotated in either direction by said actuator, said shaft coupled to said rear linkage bars to rotate said rear linkage bars about said second pivot to positively move said steps to said retracted position when said shaft is rotated in one direction and to positively move said steps to said extended position when said shaft is rotated in another direction, said drive shaft being coupled to said first locking bar to rotate said first locking bar about said second pivot to release said locking means when said shaft is rotated in one direction.

14. The combination with a vehicle having a raised floor and a doorway for access of a step assembly comprising:

a frame mounted under said floor rearwardly of the side of the vehicle;

at least one step connected to said frame by a pair of side linkage assemblies for movement of said step between a retracted position rearwardly of the side of the vehicle, and an extended position forwardly of the side of the vehicle, each linkage assembly including a front linkage bar pivotally connected to said frame at a first pivot rearwardly of the front end of said frame and a rear linkage bar pivotally connected to said frame at a second pivot rearwardly of said first pivot, said step being pivotally connected to said front linkage bar at a third pivot and to said rear linkage bar at a fourth pivot to form a parallelogram structure having said linkage bars opposite one another and said frame and step opposite one another with said linkage bars extending forwardly at a substantially angle from the vertical in the extended position to locate the forward end of said step to extend beyond the forward end of said frame a greater distance than the maximum vertical distance between the step and first pivot and to locate the forward end of said step with the forward edge of said step rearwardly of the forward end of said frame with said step being folded in the retracted position with said first pivot being located rearwardly of the side of the vehicle and said step beyond the side of the vehicle in the extended position, locking means coupled to said linkage assemblies to lock said linkage assemblies in the extended position;

power actuated drive means coupled to said linkage assemblies to release said locking means and to positively drive said step in both directions between retracted and extended positions;

said drive means including a source of motive power and a drive shaft adapted to be rotated in either direction, said drive shaft having first means engaging said locking means to release said locking means when said shaft is rotated in one direction and second means engaging said linkage assemblies to positively drive said linkage assemblies to the extended position when rotated in one direction and to positively drive said linkage assemblies to the retracted position when said shaft is rotated in the opposite direction.

* * * * *